(12) United States Patent
Oscar et al.

(10) Patent No.: US 11,079,013 B2
(45) Date of Patent: Aug. 3, 2021

(54) HYDRAULIC APPARATUS FOR STRETCHING CONDUCTORS FOR POWER LINES

(71) Applicant: TESMEC S.P.A., Milan (IT)

(72) Inventors: Alberto Oscar, Castro (IT); Roberto Pedrocchi, Solto Collina (IT)

(73) Assignee: TESMEC S.P.A., Milan (IT)

( * ) Notice: Subject to any disclaimer, the term of this patent is extended or adjusted under 35 U.S.C. 154(b) by 0 days.

(21) Appl. No.: 16/647,783

(22) PCT Filed: Sep. 20, 2018

(86) PCT No.: PCT/IB2018/057258
§ 371 (c)(1),
(2) Date: Mar. 16, 2020

(87) PCT Pub. No.: WO2019/058301
PCT Pub. Date: Mar. 28, 2019

(65) Prior Publication Data
US 2020/0232558 A1    Jul. 23, 2020

(30) Foreign Application Priority Data
Sep. 25, 2017 (IT) .................. 102017000107028

(51) Int. Cl.
*F16H 61/431* (2010.01)
*E02F 9/22* (2006.01)
*F16H 61/433* (2010.01)

(52) U.S. Cl.
CPC .......... *F16H 61/431* (2013.01); *E02F 9/2296* (2013.01); *F15B 2211/20546* (2013.01);
(Continued)

(58) Field of Classification Search
CPC .......... E02F 9/2296; F15B 2211/20546; F15B 2211/20553; F15B 2211/20569; F16H 61/433
See application file for complete search history.

(56) References Cited

U.S. PATENT DOCUMENTS 3,720,059 A * 3/1973 Schurawski ......... B62D 11/183
60/421
5,101,629 A * 4/1992 Sugiyama ............. E02F 9/2221
60/459

(Continued)

FOREIGN PATENT DOCUMENTS

GB          2341011 A      3/2000

*Primary Examiner* — F Daniel Lopez
*Assistant Examiner* — Matthew Wiblin
(74) *Attorney, Agent, or Firm* — Dickinson Wright PLLC

(57) ABSTRACT

A hydraulic apparatus for stretching conductors for power lines comprising: a variable displacement hydraulic pump (10) that supplies by means of a hydraulic fluid a hydraulic motor (11) with a closed circuit connection; a displacement regulation system (15) of said hydraulic pump (10); a regulation system (20) of said hydraulic apparatus; characterised in that said regulation system (20) comprises: an inlet (21) that receives said hydraulic fluid that supplies said hydraulic motor (11); a first outlet (22) that supplies said displacement regulation system (15); a second discharge outlet (23); a flow limiter (30) connected to said inlet (21); a regulatable valve (31) connected to said flow limiter (30); a tap (36) connected between the outlet of said regulatable valve (31) and said first outlet (22); a measurement instrument (33) connected to the outlet of said regulatable valve (31), to measure the regulation pressure of said regulation system (20); a safety valve (34) connected to the outlet of said regulatable valve (31), the outlet of which is connected to said second discharge outlet (23).

8 Claims, 1 Drawing Sheet

(52) U.S. Cl.
CPC ............... *F15B 2211/20553* (2013.01); *F15B 2211/20569* (2013.01); *F16H 61/433* (2013.01)

(56) References Cited

U.S. PATENT DOCUMENTS

| | | | |
|---|---|---|---|
| 5,813,658 A | 9/1998 | Kaminski et al. | |
| 7,093,433 B2 * | 8/2006 | Belluschi | F15B 11/055 60/450 |
| 7,454,904 B2 | 11/2008 | Belluschi | |
| 2004/0211471 A1 * | 10/2004 | Toji | F15B 13/0896 137/596 |
| 2007/0101709 A1 * | 5/2007 | Cronin | F16H 61/433 60/445 |
| 2008/0238187 A1 * | 10/2008 | Garnett | F16H 61/4096 303/112 |
| 2011/0252778 A1 * | 10/2011 | Bitter | F15B 11/162 60/422 |
| 2013/0213023 A1 * | 8/2013 | Eckstein | F16H 61/433 60/327 |
| 2019/0322167 A1 * | 10/2019 | Sohier | F16H 61/433 |

* cited by examiner

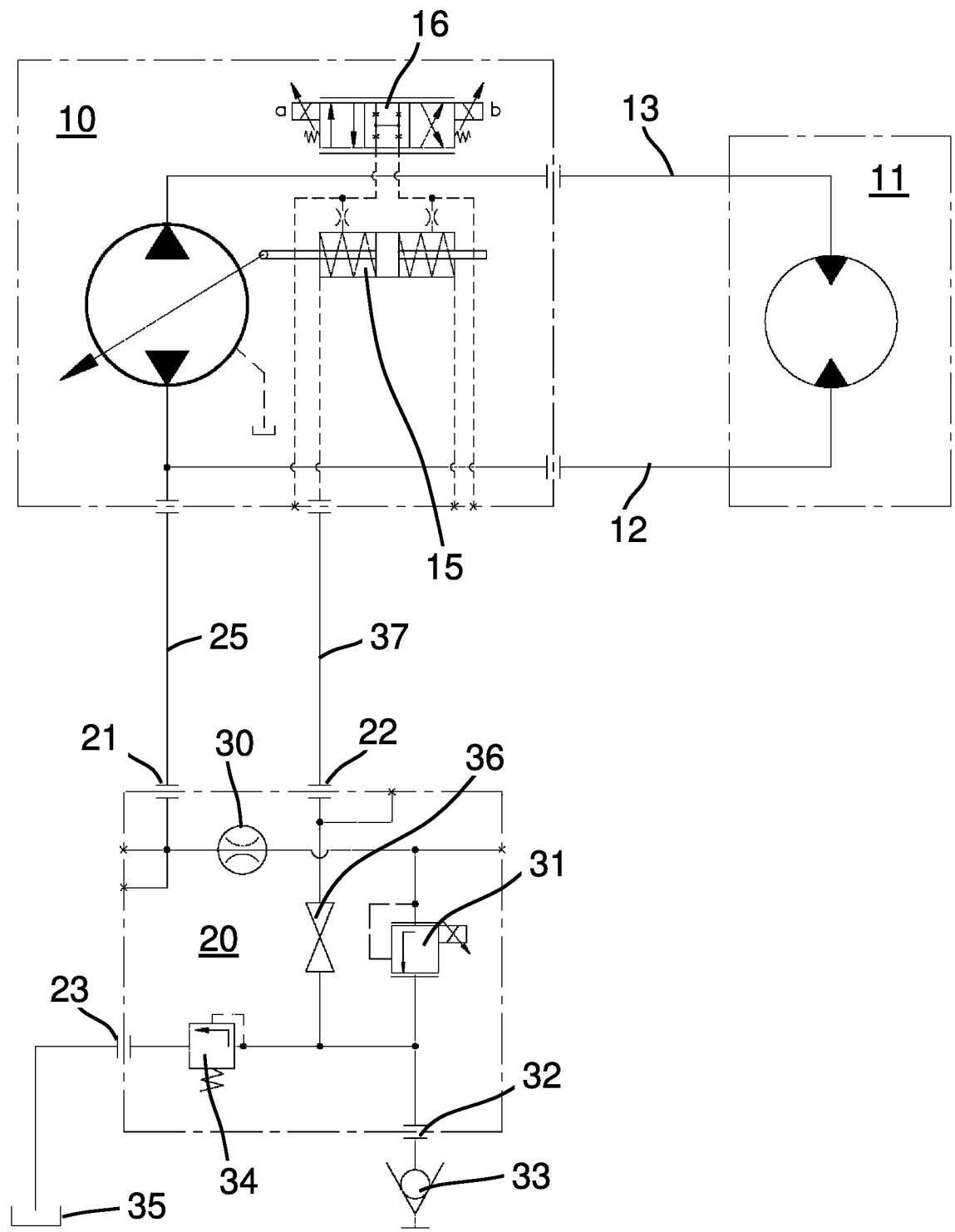

HYDRAULIC APPARATUS FOR STRETCHING CONDUCTORS FOR POWER LINES

FIELD OF THE INVENTION

The present invention relates to a hydraulic apparatus for stretching conductors for power lines, and in particular to a regulation system of a hydraulic apparatus for stretching conductors for power lines, cables, conductors and optical fibres.

BACKGROUND

The conventional stretching system of an electrical line provides for "braked" laying using machines with multiple capstans: a winching machine, which takes up a steel cable with a pulling function, and a braking machine, which applies a controlled tension to the conductors being laid so as to ensure they can remain suspended at the suitable guide devices provided on intermediate supports, so that they do not rub on the ground or against obstacles present underneath the conductors, such as roads or railway crossings, intersections with other electrical lines, etc.

Conventional winching machines for braked stretching are normally equipped with a hydraulic circuit characterised by a variable displacement pump and by a fixed displacement hydraulic motor, connected in a closed circuit, controlled by a device for limiting and controlling overload, which prevents situations of severe overload along the path of the strung cables.

One of these devices is known as "mooring regulation system" and consists of a hydraulic apparatus for regulating the working pressure of the hydraulic motor and the displacement of the hydraulic pump.

These devices are described, for example, in the documents IT 1242434, U.S. Pat. Nos. 7,093,433 and 7,454,904.

The regulation carried out consists of sending a hydraulic pressure inside the servo-control of the hydraulic pump to modify its working geometry, which translates into a decrease in the speed of the machine, until it stops if required maintaining the load when the machine works as a winch, and reversal of the operating speed of the machine when the regulation persists and the machine is driven by a driving force applied to the cable, thereby operating as a brake.

SUMMARY

The object of the present invention is to provide a hydraulic apparatus for stretching conductors for power lines, and in particular a regulation system of a hydraulic apparatus for stretching conductors for power lines that is more efficient than those of the prior art.

In accordance with the present invention, these objects and others yet are achieved with a hydraulic apparatus for stretching conductors for power lines comprising: a variable displacement hydraulic pump that supplies, by means of a hydraulic fluid, a hydraulic motor with a closed circuit connection; a displacement regulation system of said hydraulic pump; a regulation system of said hydraulic apparatus; characterised in that said regulation system comprises: an inlet that receives said hydraulic fluid that supplies said hydraulic motor; a first outlet that supplies said displacement regulation system; a second discharge outlet; a flow limiter connected to said inlet; a regulatable valve connected to said flow limiter; a tap connected between the outlet of said regulatable valve and said first outlet; a measurement instrument connected to the outlet of said regulatable valve, to measure the regulation pressure of said regulation system; a safety valve connected to the outlet of said regulatable valve, the outlet of which is connected to said second discharge outlet. Further characteristics of the invention are described in the dependent claims.

This solution has various advantages with respect to the prior art solutions.

The production of the regulation system of a hydraulic apparatus for stretching conductors for power lines is more rational with respect to those of the prior art, has a limited number of components and consequently is less expensive to produce and ensures greater reliability.

BRIEF DESCRIPTION OF THE DRAWING FIGURE

The characteristics and the advantages of the present invention will be apparent from the following detailed description of a practical embodiment thereof, illustrated purely by way of non-limiting example in the accompanying drawings, wherein:

FIG. 1 schematically shows a hydraulic apparatus for stretching conductors for power lines in combination with a regulation system of said hydraulic apparatus according to the present invention.

DETAILED DESCRIPTION

With reference to the accompanying FIGURES, a hydraulic apparatus for stretching conductors for power lines according to the present invention comprises a variable displacement hydraulic pump 10 that supplies a hydraulic motor 11 by means of a delivery pipe 12 and a return pipe 13. In particular, the hydraulic pump 10 and the hydraulic motor 11 are connected with a closed-circuit connection.

The hydraulic motor 11 is associated with a pair of capstans used to unwind and/or brake an electric cable, not shown.

The variable displacement hydraulic pump 10 is of the reversible type and comprises a displacement regulation system 15 and a control 16 (manual or electric) of the displacement regulation system 15.

The regulation system 20 of a hydraulic apparatus for stretching conductors for power lines consists of a solid hydraulic block in which the couplings for the hydraulic connections are obtained and with all the devices required for operation mounted therein.

In the block, made of metal material, typically steel, there are arranged various recesses for installing various elements and the hydraulic connections are produced directly inside the block, by means of holes produced directly in the block. The various elements are stably fixed inside the block with the aid of sealing gaskets, in the connections, of the hydraulic fluid. In this way, no external pipes are used for connection between the elements.

Specifically, the hydraulic block comprises three connections with the outside: an inlet 21 to which the line whose pressure is to be controlled is connected, an outlet 22 that supplies the displacement regulation system 15 and an outlet 23 for discharging any excess oil.

A pipe 25 that connects to the inlet 21 of the regulation system 20 is connected to the delivery line 12.

The inlet 21 is preferably connected to a flow limiter 30 with calibrated hole, which has the task of creating a first load loss and reducing the inflow, and then to a proportional maximum pressure regulatable valve 31. As this is a proportional valve, it assumes a cut-in pressure that can be regulated externally, typically via an electronic control.

The outlet of the valve 31 is connected to a further optional outlet 32 of the regulation system 20, to which it is possible to connect a measurement instrument 33, via a coupling provided, to measure the regulation pressure of the regulation system 20.

The outlet of the valve 31 is also connected to a safety valve 34, the outlet of which is connected to the outlet 23 that discharges the hydraulic fluid to an external tank 35.

The outlet of the valve 31 is also connected to a tap 36 whose outlet is connected to the outlet 22 that is connected via a pipe 37 to the pump 10 to regulate the displacement thereof, and in particular is connected to the displacement regulation system 15.

Operation of the invention is evident for those skilled in the art from the description above and in particular is as follows.

When the pressure of the hydraulic fluid in the delivery pipe 12 reaches the pressure set on the proportional valve 31, this opens and allows oil to pass along the subsequent duct, until reaching the safety valve 34, characterized by a fixed calibration of the cut-in pressure, which has the safety function of preventing overpressures that could compromise correction operation of the pump 10.

Part of the oil that flows from the valve 31 is sent to the pump 10 through the pipe 37, while the remaining part of the hydraulic fluid that flows through the valve 34, if the calibration pressure is exceeded, is discharged into the tank 35 through the outlet 23.

The oil that flows to the pump 10 from the pipe 37 passes through the tap 36, which in normal operation is in open configuration; the oil then enters the pump 10 and reaches the displacement regulation system 15, by modifying the working position previously set by the control 16 (manual or electric) of the displacement regulation system 15.

Modification of the working position leads to a decrease of the working displacement, and consequently to slowing of the machine, until it stops if required, i.e., no working displacement, and if operation were to continue, the displacement could be inverted with respect to the situation prior to this operation, generating the reverse movement of the capstans of the stretching machine, i.e. a situation of braking with controlled operating pressure.

The tap 36 is closed to facilitate the calibration operations of the valve 34. In this case, the measurement instrument 33, connectable to the coupling (mini-tap) allows the calibration pressure of the valve 34 to be measured correctly and simply, without operating directly on the hydraulic pump and therefore making it possible to carry out calibration on the workbench or outside the machine.

The regulation valve 31, which is proportional, can be controlled remotely via a cable control or a radio control, so that the operator is able to control the machine from any position and in complete safety. In addition, it is no longer necessary to carry out preliminary setting, by pressurising the hydraulic circuit and stressing the negative brake, but with the electronic control, having previously set a conversion scale between valve control current and related pressure obtained, it is possible to vary the set value at any time without stopping the system.

The flow limiter with calibrated hole 30, placed at the inlet of the valve 31, has been inserted to reduce the inflow of the regulation system 20, in this way making operation on the pump smoother and preventing pressure peaks and fluctuations thereof during regulation.

With the tap 36 and the measurement instrument 33, it is possible to easily calibrate the regulation system 20, and in particular the safety valve 34, simply by closing the tap and without having to detach pipes, ensuring optimal regulation at all times on each machine.

The invention claimed is:

1. A hydraulic apparatus for stretching conductors for power lines comprising: a variable displacement hydraulic pump (10) that supplies, by means of a hydraulic fluid, a hydraulic motor (11) with a closed circuit connection; a displacement regulation system (15) of said hydraulic pump (10); a regulation system (20) of said hydraulic apparatus; characterized in that said regulation system (20) comprises: an inlet (21) that receives said hydraulic fluid that supplies said hydraulic motor (11); a first outlet (22) that supplies said displacement regulation system (15); a second discharge outlet (23); a flow limiter (30) connected to said inlet (21); a regulatable valve (31) connected to said flow limiter (30); a tap (36) connected between the outlet of said regulatable valve (31) and said first outlet (22); a measurement instrument (33) connected to an outlet of said regulatable valve (31), to measure a regulation pressure of said regulation system (20); a safety valve (34) connected to the outlet of said regulatable valve (31), the outlet of which is connected to said second discharge outlet (23).

2. The apparatus according to claim 1, characterized in that said regulatable valve (31) is a proportional valve.

3. The apparatus according to claim 1, characterized in that said regulatable valve (31) is controlled remotely via a cable control or a radio control.

4. The apparatus according to claim 1, characterized in that an external tank (35) is connected to said second discharge outlet (23).

5. The apparatus according to claim 1, characterized in that said regulation system (20) comprises a single solid hydraulic block in which couplings for the inlet, first outlet and second discharge outlet are obtained and with the flow limiter, regulatable valve, tap, measurement instrument and safety valve required for operation mounted therein.

6. The apparatus according to claim 1, characterized in that said regulation system (20) comprises a third outlet (32), connected to said outlet of said regulatable valve (31), to which said measurement instrument (33) is connected.

7. The apparatus according to claim 1, characterized in that said hydraulic pump (10) is connected to said hydraulic motor (11) by means of a delivery pipe (12) and a return pipe (13).

8. A hydraulic apparatus for stretching conductors for power lines comprising: a variable displacement hydraulic pump (10) that supplies, by means of a hydraulic fluid, a hydraulic motor (11) with a closed circuit connection; a displacement regulation system (15) of said hydraulic pump (10); a regulation system (20) of said hydraulic apparatus; characterized in that said regulation system (20) comprises: an inlet (21) that receives said hydraulic fluid that supplies said hydraulic motor (11); a first outlet (22) that supplies said displacement regulation system (15); a second discharge outlet (23); a flow limiter (30) connected to said inlet (21); a regulatable valve (31) connected to said flow limiter (30); a tap (36) connected between an outlet of said regulatable valve (31) and said first outlet (22); a measurement instrument (33) connected to the outlet of said regulatable valve (31), to measure a regulation pressure of said regulation system (20); a safety valve (34) connected to the outlet of said regulatable valve (31), the outlet of which is connected to said second discharge outlet (23);

wherein said regulation system (20) comprises a single solid hydraulic block.

\* \* \* \* \*